(12) United States Patent
Shea

(10) Patent No.: US 10,126,054 B1
(45) Date of Patent: Nov. 13, 2018

(54) THERMOPLASTIC KETTLE AUXILIARY SINGLE-PASS OIL BATH HEAT EXCHANGER SYSTEM

(71) Applicant: James P. Shea, Waterford, MI (US)

(72) Inventor: James P. Shea, Waterford, MI (US)

(*) Notice: Subject to any disclaimer, the term of this patent is extended or adjusted under 35 U.S.C. 154(b) by 0 days.

(21) Appl. No.: 15/808,651

(22) Filed: Nov. 9, 2017

Related U.S. Application Data

(63) Continuation of application No. 15/796,096, filed on Oct. 27, 2017.

(60) Provisional application No. 62/550,916, filed on Aug. 28, 2017.

(51) Int. Cl.
*C10C 3/12* (2006.01)
*F27B 14/14* (2006.01)
*E01C 23/20* (2006.01)
*F28D 7/16* (2006.01)

(52) U.S. Cl.
CPC .............. *F27B 14/14* (2013.01); *E01C 23/20* (2013.01); *F28D 7/16* (2013.01)

(58) Field of Classification Search
CPC ........... F28D 7/16; C10B 53/02; C10B 57/10; C10B 47/44; C10B 53/07; C10B 57/02; C10B 19/00; C10B 49/02; C10B 1/10; C10B 21/10; C10B 37/00; C10B 39/06; C10B 45/00; C10B 47/00; C10B 27/06; F27B 14/14; E01C 23/20; Y02E 50/15; F26B 15/143; F26B 15/18; F26B 21/14; F26B 2200/02; F26B 23/028; F26B 25/006; F26B 3/00; F26B 3/02; F26B 3/04; F26B 11/0486; F26B 13/10; F26B 17/026; F26B 17/04; F26B 17/06; F26B 21/02
See application file for complete search history.

(56) References Cited

U.S. PATENT DOCUMENTS 3,771,643 A * 11/1973 Schmidth ............... B65G 33/00
198/525
5,041,251 A * 8/1991 McCoskey .............. B29B 9/065
264/130
5,158,689 A * 10/1992 Ishii ........................ C02F 11/08
210/762

(Continued)

FOREIGN PATENT DOCUMENTS

EP 0056732 A1 * 7/1982 ............. B05B 7/205

*Primary Examiner* — Jason Lau
(74) *Attorney, Agent, or Firm* — Brinks Gilson & Lione

(57) ABSTRACT

An auxiliary single-pass tube bundle heat exchanger for improving the melting efficiency of melter kettles used to melt thermoplastic pavement marking materials. The auxiliary single-pass tube bundle heat exchanger includes a heat transfer tube bundle having a plurality of heat transfer tubes in which the flow of molten thermoplastic material reverses directions at least once. Hot heat transfer oils flows around the plurality of heat transfer tubes. Vertical material transfer tubes connect between the bottom of the melter kettle and the top of the auxiliary single-pass tube bundle heat exchanger and between the bottom of the auxiliary single-pass tube bundle heat exchanger and the top of the melter kettle. Augers within the vertical material transfer tubes driven by reversible drive motors cause molten thermoplastic material to flow from the bottom of the melter kettle, through the auxiliary single-pass tube bundle heat exchanger, and into the top of the melter kettle.

15 Claims, 2 Drawing Sheets

(56) References Cited

U.S. PATENT DOCUMENTS

| | | | | |
|---|---|---|---|---|
| 5,290,523 A | * | 3/1994 | Koppelman | .............. C10L 9/00 165/267 |
| 2016/0216049 A1 | * | 7/2016 | Nehlen, III | ............... F28D 7/16 |

* cited by examiner

THERMOPLASTIC KETTLE AUXILIARY SINGLE-PASS OIL BATH HEAT EXCHANGER SYSTEM

RELATED APPLICATION

This application is a continuation application of U.S. Non-Provisional application Ser. No. 15/796,096, filed Oct. 27, 2017 which is based on U.S. Provisional Application Ser. No. 62/550,916, filed Aug. 28, 2017 to each of which priority is claimed under 35 U.S.C. § 120 and of which the entire specifications are both hereby expressly incorporated by reference.

BACKGROUND

The present invention relates generally to melter kettles that are designed and used to melt thermoplastic materials that are applied to pavements such as roadways, airport runways, parking lots, bicycle paths and other surfaces requiring pavement markings. More particularly the present invention is directed to systems and methods to improve the efficiency of melter kettles.

Thermoplastic materials are the product of choice for many types of pavement marking operations. However, unlike most types of marking materials thermoplastic materials must be heated to relatively high temperatures that can reach to about 420° F. to be melted and fluid enough to be applied.

Early types of thermoplastic application equipment applied the thermoplastic at slow rates. Therefore, the long melting times it took to melt thermoplastic materials in melter kettles were not a problem. Melter kettles could keep up with the slow output of application equipment.

Eventually improvements in the designs of melter kettles achieved reductions of melting times. However, over time application equipment was improved to the point at which thermoplastic material could be applied at much faster rates than the improved melter kettles could keep up with melting the thermoplastic material. The present invention increases the efficiency of melting thermoplastic in melter kettles that can be mounted on either thermoplastic application trucks, nurse trucks, trailers or the like.

For some time heat domes, also called heat risers or heat tubes, have been installed in melter kettles. The dome structure is formed by a tube of variable diameter that is attached to a hole in the base of the melter kettle where the OD of the dome base matches the ID of the hole in the base of the melter kettle. The top of the dome is closed by a metal disc. The dome reduces the heating surface area of the base. However, the dome provides additional circumference surface area that compensates for the loss of the heating area in a melter kettle with no dome and compensates for the lost surface area of the base within a few inches of dome height. From this point the dome adds more melting (heat transfer) surface area to the melter kettle with a dome as compared to a melter kettle without a dome thereby increasing the overall heating surface area in the melter kettle that acts on the thermoplastic material in the melter kettle. This reduces the ratio of the thermoplastic material to melting (heat transfer) surface area of the melter kettle which improves heating efficiency.

Additionally, heating thermoplastic material in a melter kettle from the middle of the melter kettle in an outwardly direction is more efficient than heat transfer from the outside of the melter kettle in an inward direction. Heat domes have reduced melting times in melter kettles. However, heated air in the dome cools as heat transfers through the dome wall and into the thermoplastic melter kettle. Melting times are reduced with the use of domes but still need improvement.

A recent improvement in melter kettle efficiency has been developed by the present inventor and is disclosed in U.S. non-provisional application Ser. No. 15/424,451 entitled "HEAT DOME TEMPERATURE REGULATING SYSTEM," filed Feb. 3, 2017. In this co-pending application a heat dome chimney stack tube is attached to the top center of a heat dome about which an agitator drive shaft tube rotates. Hot combustion gasses travel from the heat dome up the center of the heat dome chimney tube stack and vent into a top tube drive shaft heat chamber that has a drive shaft tube relief vents through which combustion gasses can be regulated by providing a rotational vent relief collar about the top tube driveshaft heat chamber. This system exhausts combustion gasses from the dome that has been heat depleted thereby allowing a continual flow of hot combustion gasses to maximize/optimize efficient temperature in the dome such that the maximum amount of heat is transferred through the dome and chimney stack surface areas into the thermoplastic material in the melter kettle. In this system the heat dome chimney stack tube and rotational drive shaft become heating surfaces through the centerline of the melter kettle. This system improves the rate of thermoplastic melting.

Another recent improvement in melter kettle efficiency developed by the present inventor is disclosed in U.S. non-provisional application Ser. No. 15/424,461, entitled THERMOPLASTIC KETTLE MATERIAL CIRCULATION SYSTEM, filed Feb. 3, 2017. In this improvement a single vertical material transfer tube is affixed to the side of the thermoplastic melter kettle either directly to the melter kettle side wall or outer insulation skin. The tube is attached to ports at the bottom and top of the melter kettle and an auger rotated by a direct drive motor within the vertical transfer tube moves molten thermoplastic material from the bottom of the melter kettle to the top. When the vertical material transfer tube is connected directly to the melter kettle wall the bottom interface is within the heat chamber's outer wall.

When the vertical material transfer tube is affixed to the outer insulation skin there is an extended heat chamber surrounding the vertical material transfer tube. A port larger in diameter than the lower material transfer tube allows heat from the combustion chamber to contact the vertical material transfer tube.

Another recent improvement in melter kettle efficiency developed by the present inventor is disclosed in U.S. non-provisional patent application Ser. No. 15/424,455, entitled THERMOPLASTIC KETTLE OIL BATH AUXILIARY HEAT EXCHANGER SYSTEM, filed Feb. 3, 2017. This invention combines an odd number of interconnected vertical tubes within an oil bath through which heated heat transfer oil flows. The function of the system is to increase the temperature of molten thermoplastic material moving through the circuit of interconnected heat transfer tubes by action of an independent high BTU output furnace that heats circulated heat transfer oil that circulates around the interconnected tubes. Molten thermoplastic material enters the base of the first tube through a melter kettle bottom material flow port and the tube bottom material flow port both of which are isolated from the oil bath. The molten thermoplastic material reenters the melter kettle at the top center through the top flow tube that connects to the top of the discharge tube that is above the level of the melter kettle top and is isolated from the oil bath. Each tube contains an auger.

The augers are interconnected by a gear train. A single hydraulic motor attached to any auger drives each gear and auger in a counter rotational direction. This circulates the molten thermoplastic material from the bottom of the melter kettle where it is hottest through the melter kettle bottom material flow port into the bottom of the first tube then up and down the plurality of tubes. The material flows up the last tube and through a tube top port which is isolated from the oil bath and through the top material flow tube located at a level above the top of the melter kettle fill line. The molten thermoplastic material is deposited near the top center of the melter kettle where it heats and displaces downward the thermoplastic material at the surface of the melter kettle. The heat transfer enters the oil bath tub adjacent the thermoplastic material discharge port where both the oil and thermoplastic material are at their hottest temperature and is directed through and leaves the system adjacent the thermoplastic material inlet port where it is heat depleted. When the system is disengaged and circulation ceases the hydraulic motors are run in a reverse direction to purge as much thermoplastic material from all tubes except for the inlet tube. This will leave solid material in only the first tube so that when the system is restarted it will take less heat and hydraulic energy to engage the system and begin moving molten thermoplastic material.

There is a limit to the various available energy outputs of mobile equipment systems that can be incorporated in thermoplastic equipment such as heat, electrical, engine, hydraulic, air and other systems. Some serious drawbacks to thermoplastic oil bath auxiliary heat exchanger systems are that they require a separate high BTU boiler system, separate hot oil circuits as well as oil expansion chambers designed with exotic heat transfer oils some of which require inert gas blanket interfacing. The high output boilers required need more space than is available on most thermoplastic application trucks. Motors to run the hydraulics and oil circulation systems are subject to space limitations. Weight is also a serious consideration. For each pound that the system weighs the load carrying capacity is reduced by a similar amount. Costs are high for all of the system components.

Another recent improvement in melter kettle efficiency that has been developed by the present inventor is disclosed in U.S. non-provisional patent application Ser. No. 15/424,467, entitled THERMOPLASTIC KETTLE AUXILIARY HEAT EXCHANGER SYSTEM filed Feb. 3, 2017. This system is a design that allows a plurality of interconnected tubes to be used like those in co-pending non-provisional application Ser. No. 15/424,455 where the plurality of tubes are within the heat chamber and not an oil bath. This eliminates the need for additional furnaces, pumps, hydraulic systems and an oil bath chamber that are required in the oil bath invention in co-pending non-provisional application Ser. No. 15/424,455. The interconnected plurality of tubes with auger assemblies is connected directly to the inner wall of the heat chamber. The inlet is at the bottom of the first tube's intake port and the outlet is at the top of the top of the last tube's outlet port above the fill line of the melter kettle.

There is a critical difference in both design and function of the oil bath auxiliary heat exchanger and the heat chamber auxiliary heat exchanger. In an oil bath system the thermoplastic material can never go above the temperature of the heat transfer oil. The heat transfer oil's highest operation temperature cannot exceed the baking/degradation temperature of the thermoplastic material. Therefore, the oil bath system is a failsafe system with respect to the temperature at which thermoplastic material is heated. In non-oil bath heating systems the heat chamber can exceed the baking/degradation temperature of the thermoplastic material. To prevent baking/degradation in the heat chamber system special procedures must be followed. The thermoplastic material must be constantly moving through the system during operation. At shut down the thermoplastic material must continue circulating until the melter kettle and tube walls drop below a safe temperature. It may be necessary to add ambient temperature material to the melter kettle to draw down the heat on the melter kettle and tube walls. The direction of flow in the tubes must never be reversed until a safe temperature is reached or the augers may be frozen in place.

The latest improvement for melter kettles used for melting thermoplastic pavement marking material developed by the present invention is described in U.S. provisional patent application Ser. No. 62/508,473, entitle THERMOPLASTIC KETTLE AUXILIARY MULTI-PASS OIL BATH HEAT EXCHANGER SYSTEM filed May 19, 2017, the complete disclosure of which is expressly incorporated by reference. In this system molten thermoplastic pavement marking material transferred from the bottom of a melter kettle enters a bottom inlet in an auxiliary multi-pass tube bundle heat exchanger, is heated as it passes through the auxiliary multi-pass tube heat exchanger, and is transferred from the top of the auxiliary multi-pass tube heat exchanger into the top of the melter kettle. The auxiliary multi-pass tube bundle heat exchanger has an odd numbered multi-pass assembly that allows the molten thermoplastic material to circulate in a manner that changes directions within the auxiliary multi-pass tube bundle heat exchanger. Movement of the molten thermoplastic material from the melter kettle, through the auxiliary multi-pass tube bundle heat exchanger and back into the melter kettle is achieved by means of any type of pump suitable for the purpose.

A hot oil circulation system coupled to the auxiliary multi-pass tube bundle heat exchanger heats the thermoplastic material flowing through the auxiliary multi-pass tube bundle heat exchanger by heat transfer across the tube walls and into the thermoplastic material.

The present invention provides a thermoplastic kettle single-pass auxiliary hot oil bath heat exchanger that is connected to a melter kettle by vertical material transfer tubes that connect between the bottom of the melter kettle and the top of the thermoplastic kettle single-pass auxiliary hot oil bath heat exchanger and between the bottom of the thermoplastic kettle single-pass auxiliary hot oil bath heat exchanger and the top of the melter kettle. Augers within the vertical material transfer tubes driven by reversible drive motors cause molten thermoplastic material to flow from the bottom of the melter kettle, through the thermoplastic kettle single-pass auxiliary hot oil bath heat exchanger, and into the top of the melter kettle.

BRIEF SUMMARY

According to various features, characteristics and embodiments of the present invention which will become apparent as the description thereof proceeds, the present invention provides an auxiliary single-pass tube bundle heat exchanger in combination with a melter kettle for melting thermoplastic pavement marking material wherein the auxiliary single-pass tube bundle heat exchanger comprises:

a bundle of heat transfer tubes through which thermoplastic material flows and around which hot heat transfer oil flows;

an upper heat exchanger material collection chamber at a top of the auxiliary single-pass tube bundle heat exchanger and a lower heat exchanger material collection chamber at a bottom of the auxiliary single-pass tube bundle heat exchanger;

a first vertical material transfer tube in fluid communication between a bottom of the melter kettle and the upper heat exchanger material collection chamber;

a second vertical material transfer tube in fluid communication between the lower heat exchanger material collection chamber and a top of the melter kettle; and reversibly rotating augers in each of the first and second vertical material transfer tubes for causing a flow of molten thermoplastic material from the bottom of the melter kettle, through the auxiliary single-pass tube bundle heat exchanger and into the top of the melter kettle.

The present invention further provides a method of supplying auxiliary heat to a thermoplastic material that is melted in a melter kettle, said method comprising:

providing a melter kettle;

melting thermoplastic material in the melter kettle;

providing an auxiliary single-pass tube bundle heat exchanger comprises:

a bundle of heat transfer tubes through which thermoplastic material flows and around which hot heat transfer oil flows;

an upper heat exchanger material collection chamber at a top of the auxiliary single-pass tube bundle heat exchanger and a lower heat exchanger material collection chamber at a bottom of the auxiliary single-pass tube bundle heat exchanger;

a first vertical material transfer tube in fluid communication between a bottom of the melter kettle and the upper heat exchanger material collection chamber; and a second vertical material transfer tube in fluid communication between the lower heat exchanger material collection chamber and a top of the melter kettle;

passing hot heat transfer oil around the heat transfer tubes; and transporting molten thermoplastic material from the bottom of the melter kettle through the auxiliary single-pass tube bundle heat exchanger and into the top of the melter kettle.

BRIEF DESCRIPTION OF THE DRAWINGS

The present invention will be described with reference to the attached drawings which are given as non-limiting examples only, in which.

DETAILED DESCRIPTION OF THE DRAWINGS AND THE PRESENTLY PREFERRED EMBODIMENTS

Figure 1:
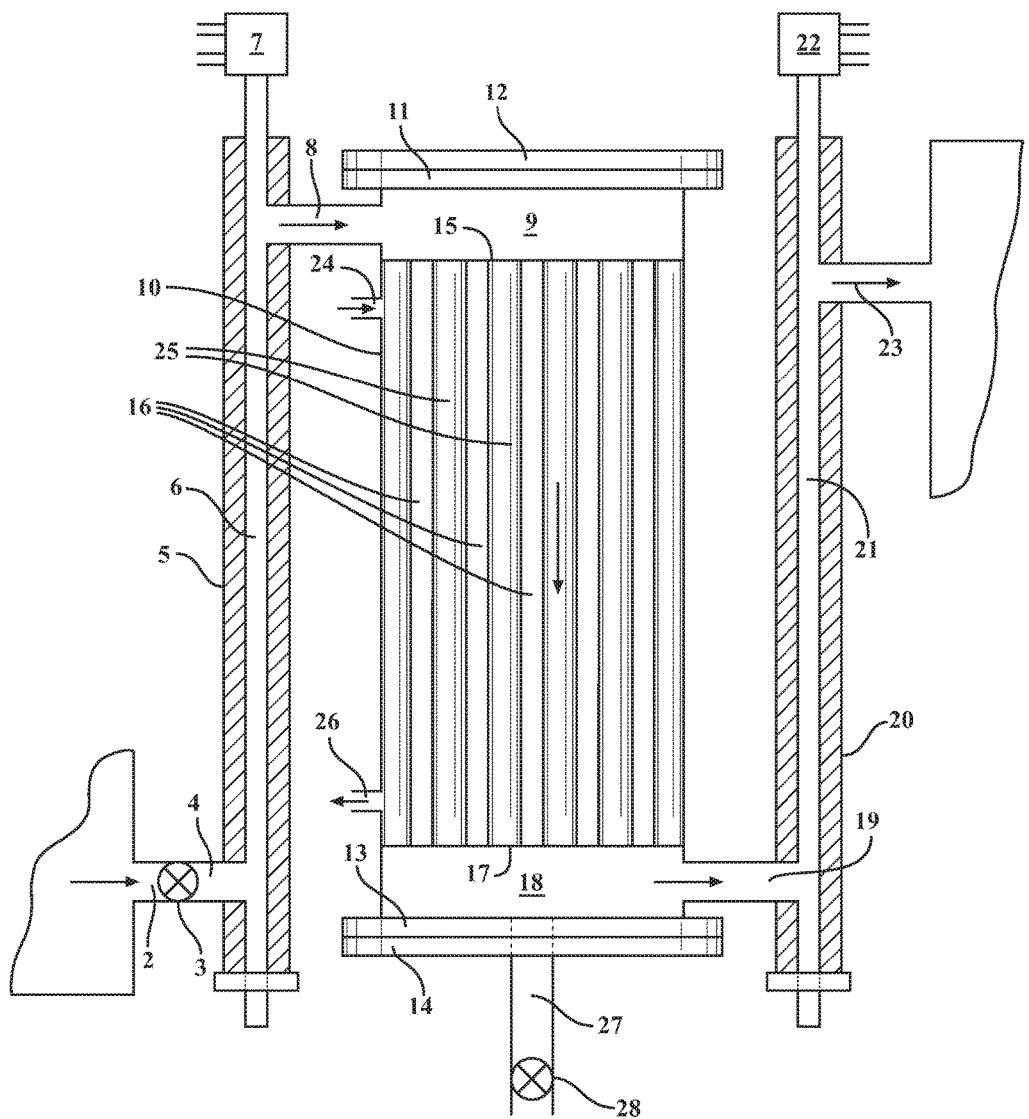
FIG. 1 is a side view of the thermoplastic kettle single-pass auxiliary hot oil bath heat exchanger circuit and a side view of the hot oil heat transfer circuit through the heat exchanger.

An object of the present invention is to reduce the melting time of thermoplastic pavement marking material melted in melter kettles that may be stationary, mounted on support trucks, support trailers or on truck mounted thermoplastic application vehicles where the vehicle is the applicator. It has been long recognized that the rate of melting thermoplastic material in melter kettles has not been able to keep up with improvements in application equipment that have increased the rate at which thermoplastic material can be applied. While the methods of application and equipment development have increased the rate of application, production melting capacity has recently lagged far behind the ability to apply the material.

The present invention is based upon the recognition that increasing the heat exchange surface area within a melter kettle to which a thermoplastic material within the melter kettle comes into contact and providing a separate heat source to heat the additional heat exchange surface will increase the rate of melting of thermoplastic material within the melter kettle. The present invention takes advantage of the fact that there is a temperature gradient between thermoplastic material flowing through applicant's auxiliary single-pass tube bundle thermoplastic heat exchanger tubes and the heat transfer oil that passes through the auxiliary single-pass tube bundle heat exchanger and around the heat exchanger's tubes. The present invention can take advantage of and use newer heat transfer oils which have been developed that can be heated to much higher temperatures than heat transfer oils that have been used in heat transfer systems on application trucks to melt thermoplastic materials in conjunction with oil jacketed thermoplastic flow lines, pumps, filters and application guns that are used in complete circuit systems from melter kettles to the exit of the application guns. The new higher temperature heat transfer oils can function at increased temperatures thereby greatly increasing the rate of heat exchange between the heat transfer oil and the molten thermoplastic material flowing through applicant's auxiliary single-pass tube bundle heat exchanger tubes. Applicant's current system disclosed herein is more efficient than heat domes, and each of applicant' co-pending non-provisional applications disclosed above. However any or all of applicant' systems and components disclosed in these co-pending non-provisional applications can be combined with the present invention and will further reduce melting time and are hereby expressly incorporated by reference.

The present invention increases the rate of melting thermoplastic pavement marking material by increasing the heat differential between the application temperature of the medium that transfers heat across tube bundle heat exchanger tubes in the auxiliary single-pass tube bundle heat exchanger as compared to previous systems.

According to the present invention the thermoplastic material in a melter kettle is heated and melted to have a viscosity which will allow it to enter the intake port of the auxiliary single-pass tube bundle heat exchanger from the base of the melter kettle where it is hottest. Then the heated, molten thermoplastic material moves through the single-pass tube bundle circuit by action of augers to the outlet port at the top of the outlet chamber from where it passes through a connector to a melter kettle top port above the fill line of the melter kettle.

Another aspect of this invention is based upon dynamic heat exchange. The action of heating thermoplastic material by moving relatively hot thermoplastic material from the bottom of the melter kettle to the top of the melter kettle where material is added is considered passive. The heat exchange system of the present invention is also a dynamic system whereby heat transfer oil is heated by a high BTU output furnace well above that of the temperature required to apply thermoplastic material and is circulated by a hot oil pump through a dedicated hot oil circuit and through an auxiliary single-pass tube bundle heat exchanger tube bundle chamber. The heat is transferred from the heat transfer oil across the tube walls and into the molten thermoplastic pavement marking material. Augers with adequate force move the molten thermoplastic material from the melter kettle bottom outlet port into, through and out of the heat exchanger at the top discharge port that connects to the melter kettle inlet that is above the fill level.

FIG. 1 is a side view of the thermoplastic kettle single-pass auxiliary hot oil bath heat exchanger circuit and a side view of the hot oil heat transfer circuit through the heat exchanger. The thermoplastic kettle single-pass auxiliary hot oil bath heat exchanger (also referred to herein as an auxiliary single-pass tube bundle heat exchanger) receives molten thermoplastic material from the bottom of melter kettle 1, transfers heat into the molten thermoplastic material as it passes through the thermoplastic kettle single-pass auxiliary hot oil bath heat exchanger and delivers the heated molten thermoplastic material into the top of the melter kettle 1. For purposes of illustration the melter kettle is drawn on both sides of the thermoplastic kettle single-pass auxiliary hot oil bath heat exchanger in FIG. 1. As a practical matter the thermoplastic kettle single-pass auxiliary hot oil bath heat exchanger is provided near the melter kettle and suitable molten thermoplastic material transfer tubes/piping are used to connect the inlet of thermoplastic kettle single-pass auxiliary hot oil bath heat exchanger to the outlet of the melter kettle and the outlet of the thermoplastic kettle single-pass auxiliary hot oil bath heat exchanger to the inlet of the melter kettle (see FIG. 3).

The thermoplastic kettle single-pass auxiliary hot oil bath heat exchanger includes a heat transfer tube bundle that comprises a plurality of heat transfer tubes 16 that are contained within the side wall 10 of the thermoplastic kettle single-pass auxiliary hot oil bath heat exchanger and extend between upper tube sheet 15 and lower tube sheet 17. The thermoplastic kettle single-pass auxiliary hot oil bath heat exchanger depicted in FIGS. 1-3 has a circular cross-section; however, the thermoplastic kettle single-pass auxiliary hot oil bath heat exchanger is not limited to having a circular cross-section and can have any cross-sectional shape, including a cross-sectional shape that provides space accommodation on pavement marking equipment.

The upper tube sheet 15 and lower tube sheet 17 define upper and lower heat exchanger material collection chambers 9 and 18 which are discussed below. The side wall 10 of the thermoplastic kettle single-pass auxiliary hot oil bath heat exchanger includes a heat transfer inlet 24 and a heat transfer oil outlet 26 through which heated heat transfer oil is circulated through the thermoplastic kettle single-pass auxiliary hot oil bath heat exchanger around the heat transfer tubes in the heat transfer tube bundle. The heat transfer oil is heated by an external heating system (not shown) and is recirculated through the thermoplastic kettle single-pass auxiliary hot oil bath heat exchanger after being reheated.

The upper heat exchanger material collection chamber 9 is connected to the top of vertical material transfer tube 5 via top material inlet tube 8. The bottom of vertical material transfer tube 5 is connected to the bottom of melter kettle 1 via bottom material inlet tube 4 which is provided with a shutoff valve 3. Vertical material transfer tube 5 has an auger 6 extending therethrough which is rotated by a counter rotating motor 7.

The lower heat exchanger material collection chamber 18 is connected to the bottom of vertical material transfer tube 20 via bottom outlet tube 19. The top of vertical material transfer tube 20 is connected to the top of melter kettle 1 via top material exit tube 23. Vertical material transfer tube 20 has an auger 21 extending therethrough which is rotated by a counter rotating motor 22.

The top of the thermoplastic kettle single-pass auxiliary hot oil bath heat exchanger is sealed by a top cap 12 that is secured to top flange 11 by suitable mechanical fasteners (not shown). Likewise the bottom of the thermoplastic kettle single-pass auxiliary hot oil bath heat exchanger is sealed by a bottom cap 14 that is secured to a bottom flange 13 by suitable mechanical fasteners (not shown). As show the bottom of the thermoplastic kettle single-pass auxiliary hot oil bath heat exchanger is provided with a drain 27 having a shutoff valve 28 therein which can be used to purge or drain molten thermoplastic material and/or glass beads therein from the thermoplastic kettle single-pass auxiliary hot oil bath heat exchanger.

As depicted in FIG. 1 (See arrows) molten flowable thermoplastic is drawn from kettle 1 through kettle material outlet tube 2 and shutoff valve 3 and into bottom material inlet tube 4 of vertical material transfer tube 5 by rotation of transfer auger 6 using counter rotating motor 7. The molten flowable thermoplastic material is lifted to the top of material transfer tube 5 into and through top material outlet tube 8 into the top heat exchanger material collection chamber 9.

The molten flowable thermoplastic material collected in the top material collection chamber 9 flows down through the tube 16 of the heat transfer tube and into the bottom collection chamber 18. Molten flowable thermoplastic material received in bottom collection chamber 18 is drawn through the bottom outlet tube 19 that is connected to the bottom of vertical material transfer tube 20 by rotation of transfer auger 21 using counter rotating motor 22. The molten flowable thermoplastic material is lifted up vertical material transfer tube 20 and exits through top material exit tube 23 into kettle 1 above the kettle material fill line.

Heat transfer oil that is circulated through the tube bundle by entering through fluid inlet port 24, circulating through void spaces 25 around the heat transfer tubes 16 and exiting through fluid outlet port 26. In an alternative embodiment the heat transfer oil can be circulated through the tube bundle in an opposite direction. Any conventional furnace/pump system can be used to heat and circulate the heat transfer oil.

Figure 2:
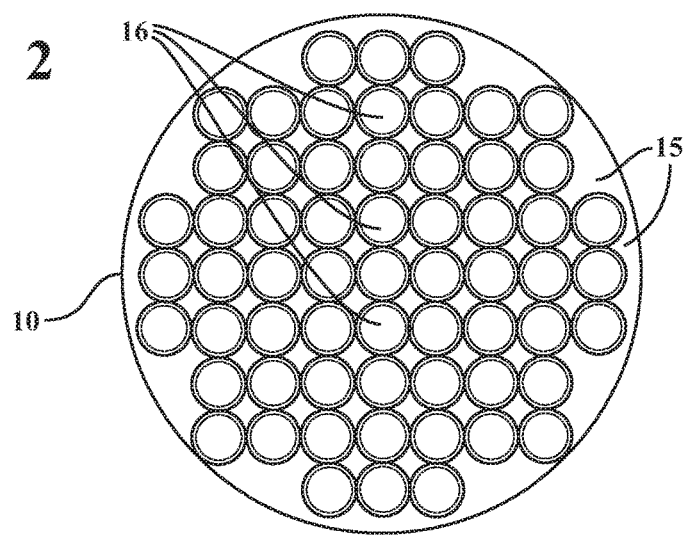
FIG. 2 is a top view of the upper tube sheet 15 showing heat transfer tubes 16 that form the tube bundle within the side wall 10.

FIG. 2 is a top view of the upper tube sheet 15 showing heat transfer tubes 16 that form the tube bundle within the side wall 10.

Figure 3:
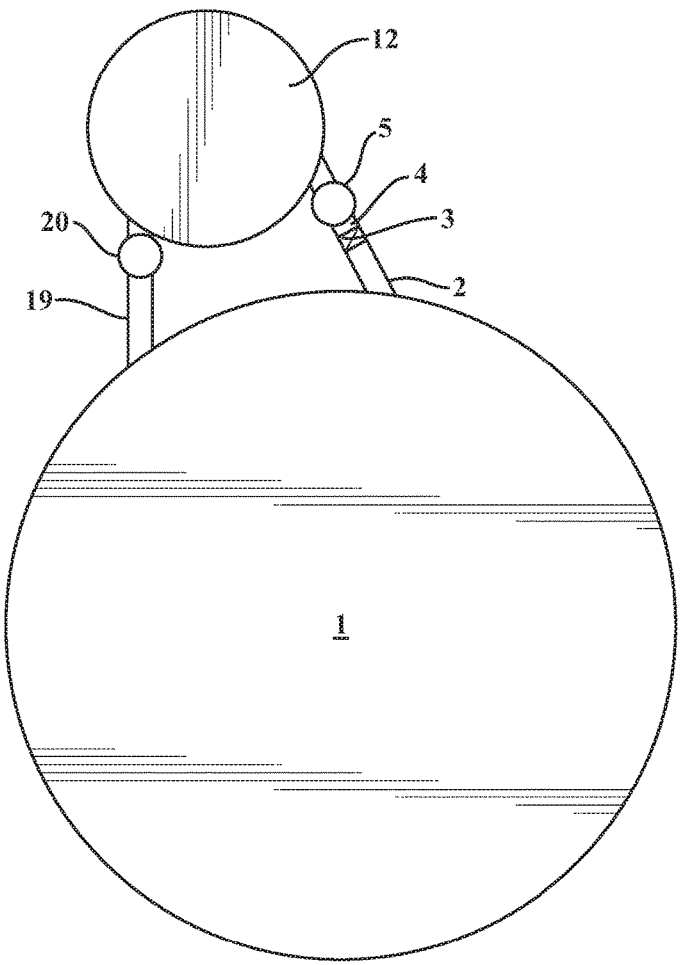
FIG. 3 is a top schematic view a thermoplastic kettle single-pass auxiliary hot oil bath heat exchanger in series with a melter kettle according to one embodiment of the present invention.

FIG. 3 is a top schematic view a thermoplastic kettle single-pass auxiliary hot oil bath heat exchanger in series with a melter kettle according to one embodiment of the present invention. When material becomes molten and flowable it is moved by action of augers 6 and 21 through the circuit whereby it leaves kettle 1 and moves through tubes 2 and 4 when valve 3 is open. Material is heated in the auxiliary heat exchanger 12 and reenters the kettle through inlet port 19.

The use of the vertical material transfer tubes 5 and 20 with the augers 6 and 21 that can be reversibly driven allows for removing molten thermoplastic material from the thermoplastic kettle single-pass auxiliary hot oil bath heat exchanger after a pavement marking job is complete. During such molten thermoplastic material removal the shutoff valve 3 in bottom material inlet tube 4 can be closed and any necessary venting to relief back pressure can be provided so that the augers 6 and 21 can remove molten thermoplastic material from the thermoplastic kettle single-pass auxiliary hot oil bath heat exchanger. In addition any residual molten thermoplastic material remaining in the lower collection chamber can be removed through drain 27.

Although the present invention has been described with reference to particular means, materials and embodiments, from the foregoing description, one skilled in the art can easily ascertain the essential characteristics of the present invention and various changes and modifications can be made to adapt the various uses and characteristics without departing from the spirit and scope of the present invention as described above and set forth in the attached claims.

The invention claimed is:

1. An auxiliary single-pass tube bundle heat exchanger in combination with a melter kettle for melting thermoplastic pavement marking material wherein the auxiliary single-pass tube bundle heat exchanger comprises:
   a bundle of heat transfer tubes through which thermoplastic material flows and around which hot heat transfer oil flows;
   an upper heat exchanger material collection chamber at a top of the auxiliary single-pass tube bundle heat exchanger and a lower heat exchanger material collection chamber at a bottom of the auxiliary single-pass tube bundle heat exchanger;
   a first material transfer tube in fluid communication between a bottom of the melter kettle and the upper heat exchanger material collection chamber;
   a second material transfer tube in fluid communication between the lower heat exchanger material collection chamber and a top of the melter kettle; and
   means for causing a flow of molten liquid thermoplastic material from the bottom of the melter kettle, through the first material transfer tube, through the auxiliary single-pass tube bundle heat exchanger, through the second material transfer tube, and into the top of the melter kettle.

2. An auxiliary single-pass tube bundle heat exchanger in combination with a melter kettle according to claim 1, wherein the means for causing the flow of molten liquid thermoplastic material comprises rotating augers.

3. An auxiliary single-pass tube bundle heat exchanger in combination with a melter kettle according to claim 2, wherein the bundle of heat transfer tubes include upper and lower tubesheets to which upper and lower ends of the heat transfer tubes are attached, the tubesheets containing the hot heat transfer oil to flow around the heat transfer tubes between the upper and lower tubesheets.

4. An auxiliary single-pass tube bundle heat exchanger in combination with a melter kettle according to claim 3, wherein the hot heat transfer oils flows from an upper to a lower portion of the auxiliary single-pass tube bundle heat exchanger and the molten thermoplastic material flows from a lower to an upper portion of the auxiliary single-pass tube bundle heat exchanger.

5. An auxiliary single-pass tube bundle heat exchanger in combination with a melter kettle according to claim 2, wherein the lower heat exchanger material collection chamber is provided with a drain through which molten thermoplastic material and/or glass beads can be removed from the auxiliary single-pass tube bundle heat exchanger.

6. An auxiliary single-pass tube bundle heat exchanger in combination with a melter kettle according to claim 2, wherein the top and bottom of the auxiliary single-pass tube bundle heat exchanger are closed by removable caps.

7. An auxiliary single-pass tube bundle heat exchanger in combination with a melter kettle according to claim 2, wherein a shutoff valve is provided between the bottom of the melter kettle and the upper heat exchanger material collection chamber.

8. An auxiliary single-pass tube bundle heat exchanger in combination with a melter kettle according to claim 2, further comprising a heat transfer oil furnace and hot oil circulation pump coupled to the auxiliary single-pass tube bundle heat exchanger to pass hot oil round the heat transfer tubes.

9. A method of supplying auxiliary heat to a thermoplastic material that is melted in a melter kettle, said method comprising:
   providing a melter kettle;
   melting thermoplastic material in the melter kettle;
   providing an auxiliary single-pass tube bundle heat exchanger comprises:
      a bundle of heat transfer tubes through which thermoplastic material flows and around which hot heat transfer oil flows;
      an upper heat exchanger material collection chamber at a top of the auxiliary single-pass tube bundle heat exchanger and a lower heat exchanger material collection chamber at a bottom of the auxiliary single-pass tube bundle heat exchanger;
      a first material transfer tube in fluid communication between a bottom of the melter kettle and the upper heat exchanger material collection chamber; and
      a second material transfer tube in fluid communication between the lower heat exchanger material collection chamber and a top of the melter kettle;
   passing hot heat transfer oil around the heat transfer tubes; and
   transporting molten liquid thermoplastic material from the bottom of the melter kettle through the auxiliary single-pass tube bundle heat exchanger and into the top of the melter kettle.

10. A method of supplying auxiliary heat to a thermoplastic material that is melted in a melter kettle according to claim 9, wherein augers provided in the first and second material transfer tubes are rotated to cause the molten thermoplastic material to be transported from the bottom of the melter kettle through the auxiliary single-pass tube bundle heat exchanger and into the top of the melter kettle.

11. A method of supplying auxiliary heat to a thermoplastic material that is melted in a melter kettle according to claim 10, wherein the augers are reversible rotatable.

12. A method of supplying auxiliary heat to a thermoplastic material that is melted in a melter kettle according to claim 9, wherein a drain is provided in the bottom of the auxiliary single-pass tube bundle heat exchanger for removing molten thermoplastic from the lower heat exchanger material collection chamber.

13. An auxiliary single-pass tube bundle heat exchanger in combination with a melter kettle according to claim 1, wherein the means for causing the flow of molten liquid thermoplastic material comprises a pump.

14. An auxiliary single-pass tube bundle heat exchanger in combination with a melter kettle according to claim 1, wherein the means for causing the flow of molten liquid thermoplastic material comprises a rotating auger in each of the first and second material transfer tubes.

15. A method of supplying auxiliary heat to a thermoplastic material that is melted in a melter kettle according to claim 9, wherein a pump is used to cause the molten thermoplastic material to be transported from the bottom of the melter kettle through the auxiliary single-pass tube bundle heat exchanger and into the top of the melter kettle.

* * * * *

UNITED STATES PATENT AND TRADEMARK OFFICE
CERTIFICATE OF CORRECTION

PATENT NO. : 10,126,054 B1
APPLICATION NO. : 15/808651
DATED : November 13, 2018
INVENTOR(S) : James P. Shea It is certified that error appears in the above-identified patent and that said Letters Patent is hereby corrected as shown below:

In the Specification

Column 3, Line 14 should be changed from "The heat transfer enters the oil bath tub" to --The heat transfer oil enters the oil bath chamber--

Signed and Sealed this
Twelfth Day of February, 2019

Andrei Iancu
*Director of the United States Patent and Trademark Office*